United States Patent
Takasu et al.

(10) Patent No.: US 11,914,206 B2
(45) Date of Patent: Feb. 27, 2024

(54) COMPUTER-READABLE NON-TRANSITORY MEDIUM, ABNORMALITY DETECTION DEVICE AND ABNORMALITY DETECTION METHOD

(71) Applicant: FUJITSU LIMITED, Kawasaki (JP)

(72) Inventors: Yoichi Takasu, Isehara (JP); Takahiro Arioka, Atsugi (JP); Takeo Kasajima, Machida (JP); Kazushi Uno, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 17/848,799

(22) Filed: Jun. 24, 2022

(65) Prior Publication Data

US 2023/0097688 A1 Mar. 30, 2023

(30) Foreign Application Priority Data

Sep. 30, 2021 (JP) ................. 2021-160279

(51) Int. Cl.
*G02B 6/44* (2006.01)
*G01M 11/02* (2006.01)
*G01H 9/00* (2006.01)
*H02G 1/02* (2006.01)

(52) U.S. Cl.
CPC .......... *G02B 6/4422* (2013.01); *G01H 9/004* (2013.01); *G01M 11/02* (2013.01); *H02G 1/02* (2013.01)

(58) Field of Classification Search
CPC ..... G02B 6/4422; G01H 9/004; G01M 11/02; H02B 1/02
See application file for complete search history.

(56) References Cited

U.S. PATENT DOCUMENTS

| | | | | |
|---|---|---|---|---|
| 2011/0242525 | A1* | 10/2011 | Strong | ................. G01M 11/083 356/73.1 |
| 2021/0247215 | A1 | 8/2021 | Yoda et al. | |
| 2022/0044552 | A1* | 2/2022 | Yoda | ................ G08G 1/096741 |
| 2023/0098933 | A1* | 3/2023 | Arioka | ...................... G01P 5/00 73/657 |

FOREIGN PATENT DOCUMENTS

CN 110686626 B 3/2021
CN 113049909 A 6/2021
(Continued)

OTHER PUBLICATIONS

Extended European Search Report dated Nov. 22, 2022 in related European Patent Application No. 22180689.6 (7 pages).

(Continued)

*Primary Examiner* — Daniel Petkovsek
(74) *Attorney, Agent, or Firm* — STAAS & HALSEY LLP

(57) ABSTRACT

A computer-readable, non-transitory medium storing a program that causes a computer to execute a process is provided. The process includes acquiring a backward Rayleigh scattered light from an optical fiber composite overhead ground wire of an electrical power transmission facility; generating vibration information of a frequency band including a natural frequency of the optical fiber composite overhead ground wire, on a basis of the backward Rayleigh scattered light; and detecting abnormality of the electrical power transmission facility, on a basis of the vibration information.

18 Claims, 12 Drawing Sheets

(56) References Cited

FOREIGN PATENT DOCUMENTS

| | | |
|---|---|---|
| CN | 113189450 B | 7/2021 |
| JP | 2018-141663 A | 9/2018 |
| WO | WO 2020/044655 A1 | 3/2020 |

OTHER PUBLICATIONS

Tokuo Tsuji et al., "Attempt to locate loose bolts on transmission towers using a high-speed camera"; Kyushu University, the 69th Annual Scientific Meeting of the Japan Society of Civil Engineers, pp. 1085-1086, Sep. 2014 (2 pages).

"Smart Security in the Electric Power Industry, Status of Initiatives and Future Prospects"; The Federation of Electric Power Companies of Japan, Dec. 3, 2020.

Takeshi Kodama, "Study on the Use of Drones for Power Transmission Facility Inspection Work"; The Chugoku Electric Power Co., Inc., Energia Research Institute Review, vol. 3, No. 53, pp. 9-10, 2018.

Hiroshi Asano, "Actual conditions and challenges of IoT in power equipment maintenance" 1st Study Group on Digitalization of Power Infrastructure, Nov. 29, 2016; Central Institute of Electrical Power, Nov. 29, 2016; (9 pages) (1 page English Translation).

Yoshio Shichiri et al, "Vibration of overhead lines and steel pylons"; School of Engineering, Osaka University, Journal of the Institute of Electrical Engineers of Japan, vol. 73, No. 782, pp. 1223-1225, Nov. 1953.

Tokuo Tsuji et al., "Studies on deterioration detection of aged transmission towers using high resolution camera"; Kanazawa University, Journal of Structural Engineering, vol. 1, 63A, pp. 570-580, Mar. 2017.

OPGW Cleats, Sumiden Transmission and Distribution System Products, Ltd., URL: http://wwwsumiden-kiki.co.jp/products/transmission_line/opgw.html; retrieved on May 20, 2022 (2 pages).

Wedge-shaped Retaining Clamp; Furukawa Electric; URL:http//www.furukawa.co.jp/csr/environment/emission/clamp.html; retrieved on Jun. 24, 2022 (2 pages).

Insulator, wikipedia; URL: http://ja.wikipedia.org/wiki/E3%81%8C%E3%81%84%E3%81%97; retrieved on May 20, 2022 (6 pages).

\* cited by examiner

COMPUTER-READABLE NON-TRANSITORY MEDIUM, ABNORMALITY DETECTION DEVICE AND ABNORMALITY DETECTION METHOD

CROSS-REFERENCE TO RELATED APPLICATION

This application is based upon and claims the benefit of priority of the prior Japanese Patent Application No. 2021-160279, filed on Sep. 30, 2021, the entire contents of which are incorporated herein by reference.

FIELD

A certain aspect of embodiments described herein relates to a computer-readable non-transitory medium, an abnormality detection device and an abnormality detection method.

BACKGROUND

Electrical power transmission facilities such as electrical power lines, steel towers, and overhead ground wires deteriorate due to natural disasters and deterioration over time, which hinders the stable supply of electric power. In order to prevent the problem, it is preferable to monitor the electrical power transmission facilities and maintain them appropriately when an abnormality is detected.

As a method of monitoring the electrical power transmission facilities, there are a method of monitoring by a worker and a method of monitoring by a drone or a helicopter. The method of monitoring by the worker requires the worker to work at a high place on the steel tower, which is dangerous. In addition, the method of monitoring with a drone or a helicopter has a high cost because the monitoring area is wide.

On the other hand, a method of monitoring whether there is an abnormality in the electrical power transmission facilities by providing a vibration sensor in the electrical power transmission facilities and monitoring whether there is an abnormality in the vibration measured by the vibration sensor is also conceivable. However, since the area where the vibration sensor can detect vibration is very small, a huge amount of vibration sensor is required to monitor a range of several hundred kilometers, for example.

SUMMARY

According to an aspect of the present invention, there is provided a computer-readable, non-transitory medium storing a program that causes a computer to execute a process, the process including: acquiring a backward Rayleigh scattered light from an optical fiber composite overhead ground wire which an electrical power transmission facility has; generating vibration information of a frequency band including a natural frequency of the optical fiber composite overhead ground wire, on a basis of the backward Rayleigh scattered light; and detecting abnormality of the electrical power transmission facility, on a basis of the vibration information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Before describing an embodiment, a description will be given of matters which the present inventor studied.

Figure 1:
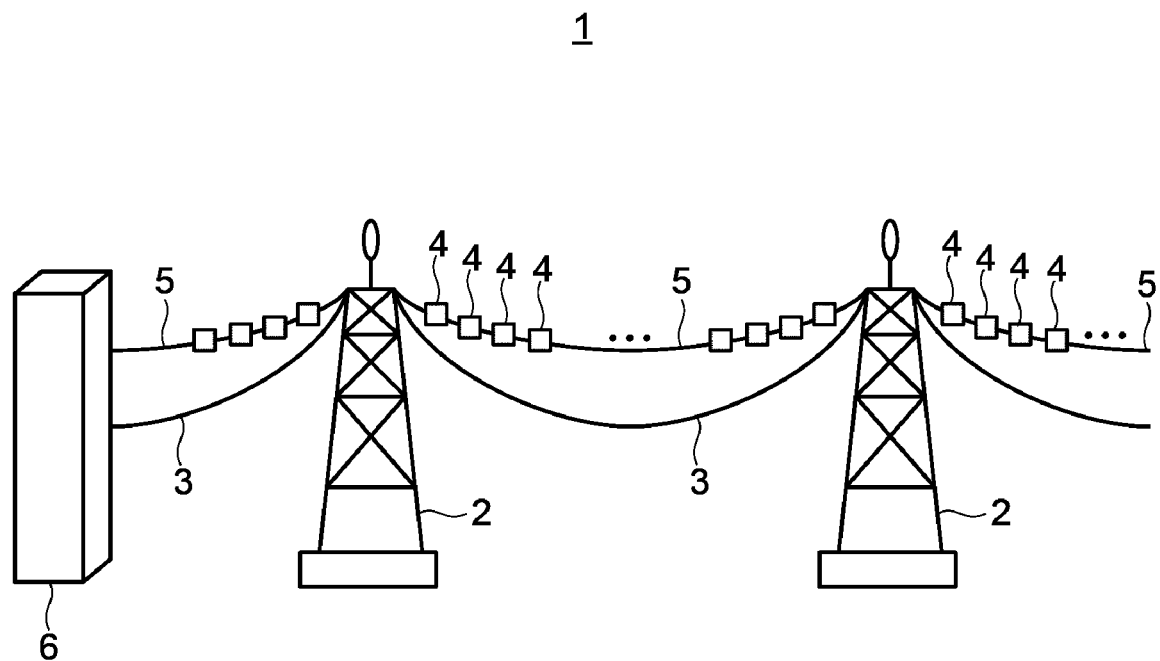
FIG. 1 schematically illustrates an electrical power transmission facility.

FIG. 1 schematically illustrates an electrical power transmission facility 1. The electrical power transmission facility 1 has steel towers 2, an electrical power transmission lines 3, vibration sensors 4, OPGWs (Optical fiber composite overhead Ground Wires) 5 and substations 6.

The electrical power transmission line 3 is an electric wire that transmits an alternating current transformed at the substation 6. The OPGW 5 is a wire in which an optical fiber is housed in the center of an overhead ground wire. The steel tower 2 is a tower that supports the electrical power transmission line 3 and the OPGW 5. In the following, an interval between two of the steel towers 2 will be referred to as a span. The vibration sensor 4 is a sensor that measures the natural vibration of the OPGW 5.

Figure 2A:
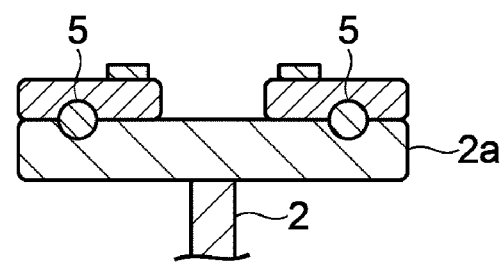
FIG. 2A is a cross-sectional view of an OPGW as seen in a cross section perpendicular to an extending direction of the OPGW.

FIG. 2A is a cross-sectional view of the OPGW 5 as seen in a cross section perpendicular to the extending direction of the OPGW 5. As illustrated in FIG. 2A, the OPGW 5 is supported by the steel tower 2 by cleats 2a.

Figure 2B:
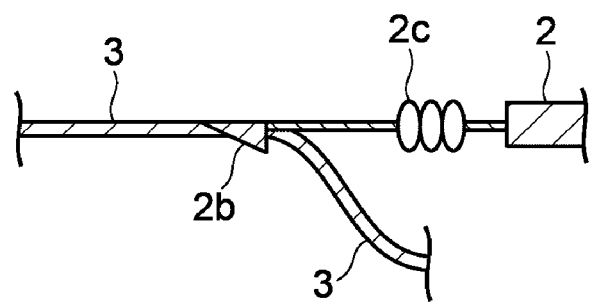
FIG. 2B is a schematic diagram of an electrical power transmission line near the steel tower.

FIG. 2B is a schematic diagram of the electrical power transmission line 3 near the steel tower 2. As illustrated in FIG. 2B, the electrical power transmission line 3 is supported by the steel tower 2 via a clamp 2b and an insulator 2c.

The natural frequency of the OPGW 5 fluctuates depending on the tension of the OPGW 5. Therefore, when bolts, the cleats 2a, the clamps 2b, etc. of the steel tower 2 are loosened, the tension of the OPGW 5 also changes, and the natural frequency of the OPGW 5 also changes. By detecting this change in the natural frequency with the vibration sensor 4 (see FIG. 1), it is possible to determine whether there is an abnormality in the electrical power transmission facility 1.

However, in order to capture the changes in the natural vibration with high accuracy, it is necessary to install the vibration sensors 4 at intervals of 10 m in the OPGW 5 having a length of about 100 km, for example. Therefore, an extremely large number of the vibration sensors 4 are required.

Moreover, since it is difficult to supply electrical power to the vibration sensor 4 from the outside, an extra configuration such as a power generation system and a battery for power supply is required. Further, the electrical power transmission facility 1 also exists in a mountainous area outside the service area of the public line network. Therefore, a wireless communication function for data collection is also required.

Since these electronic devices such as vibration sensors, power generation systems, and communication devices are used outdoors, high reliability and maintenance-free operation are required. The service life of an electrical power transmission equipment is several decades, which is longer than that of an electronic equipment. Therefore, maintenance costs are high.

Figure 3:
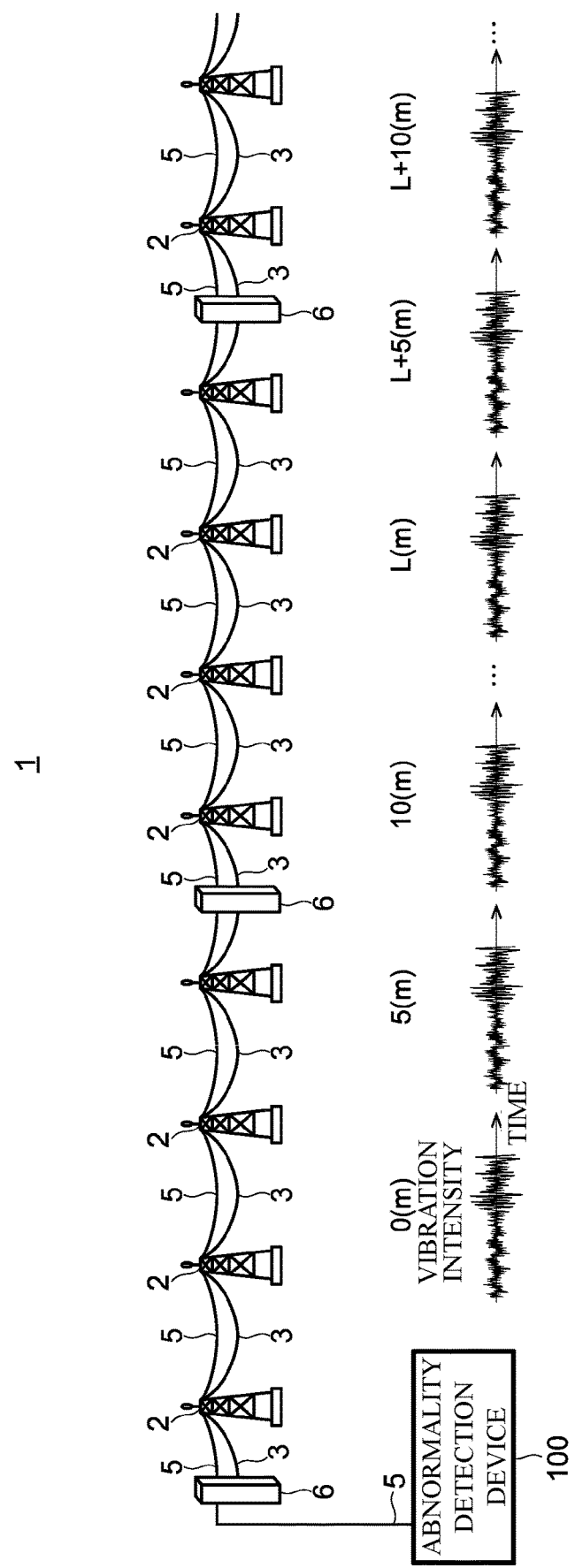
FIG. 3 schematically illustrates a system in accordance with an embodiment.

(Embodiment) FIG. 3 schematically illustrates a system in accordance with an embodiment. In FIG. 3, the same elements as those of FIG. 1 have the same numerals as those of FIG. 1. And, an explanation of the elements is omitted.

The system is used for detecting abnormality of the electrical power transmission facility 1 and has an abnormality detection device 100.

The embodiment uses an optical fiber vibration measurement system (DAS: Distributed Acoustic Sensing) as the abnormality detection device 100. DAS is a system that calculates the vibration due to expansion and contraction of the optical fiber, based on the time from when a pulsed light is incident on the optical fiber of the OPGW 5 until the rear Rayleigh scattered light returns, the phase difference of the rear Rayleigh scattered light, and the intensity of the rear Rayleigh scattered light.

Figure 4A:
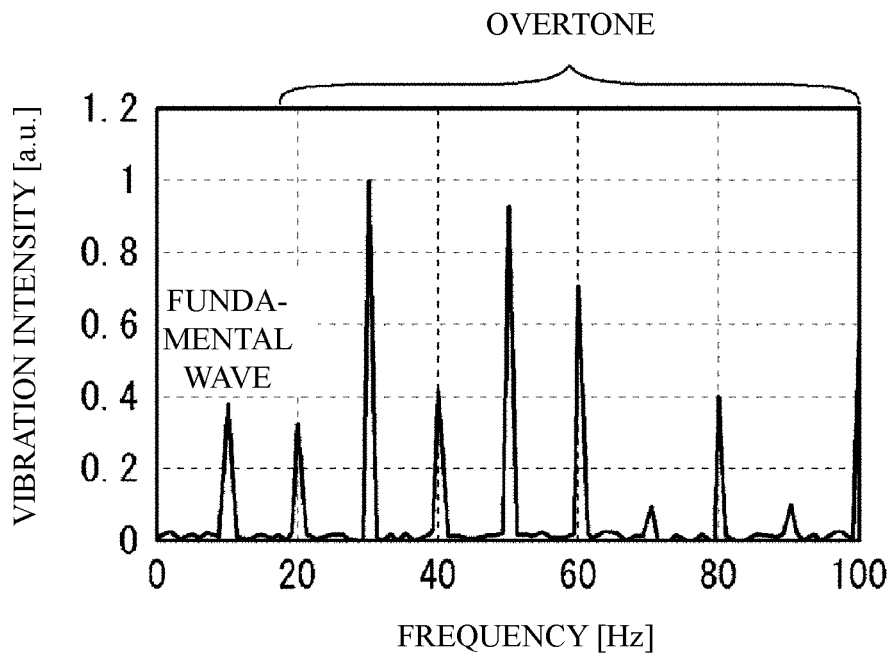
FIG. 4A is a graph illustrating frequency characteristics at a certain point of an OPGW.

FIG. 4A is a graph illustrating the frequency characteristics at a certain point of the OPGW 5. The horizontal axis of the graph indicates the frequency of the OPGW 5, and the vertical axis indicates the vibration intensity in an arbitrary unit.

As illustrated in FIG. 4A, the fundamental wave and its overtones appear as the natural frequencies in the frequency characteristics of the OPGW 5. On the other hand, the DAS can obtain the frequency characteristics at all the points of the OPGW 5 instead of the frequency characteristics of only one point of the OPGW 5 in this way.

Figure 4B:
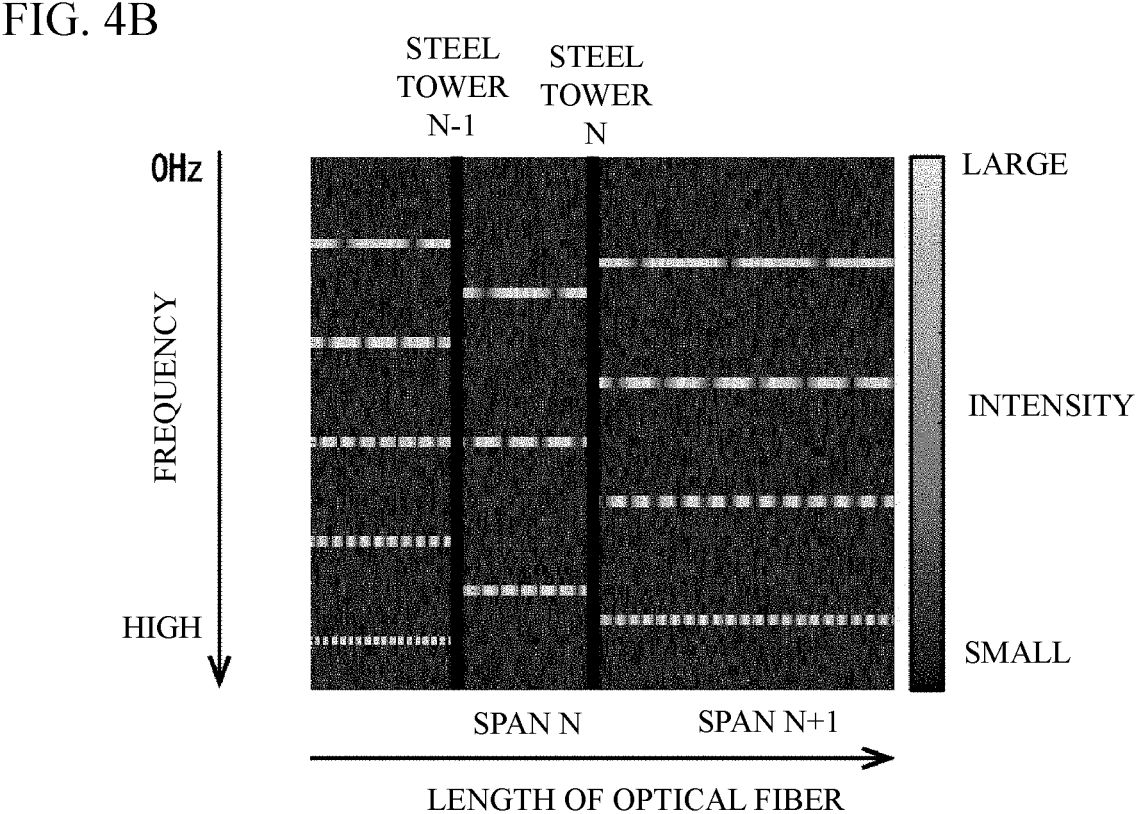
FIG. 4B is a schematic diagram of frequency characteristics of an OPGW acquired by DAS used as an abnormality detection device.

FIG. 4B is a schematic diagram of the frequency characteristics of the OPGW 5 acquired by the DAS used as the abnormality detection device 100. The horizontal axis of this figure indicates the length of the OPGW 5, and the vertical axis indicates the frequency. In this frequency characteristic, the intensity of vibration is indicated by shades of gray. The lighter the color is, the greater the intensity of vibration is. Further, a plurality of substantially white linear regions extending in the lateral direction indicate the natural frequency of the OPGW 5 stretched between the respective spans. As illustrated in FIG. 4B, it can be seen that the natural frequency differs depending on the span.

The natural frequency "v" of the OPGWS can be expressed by the following equation (1).

[Equation 1]

$$v = \frac{n}{2l}\sqrt{\frac{T}{\rho}} \quad (1)$$

In an equation (1), "1" indicates the length of the span, and "T" indicates the tension of the OPGW 5. Further, "p" indicates the linear density of the OPGW 5, and "n" (=1, 2, 3, ... ) is a natural number indicating the mode of vibration.

Figure 5A:
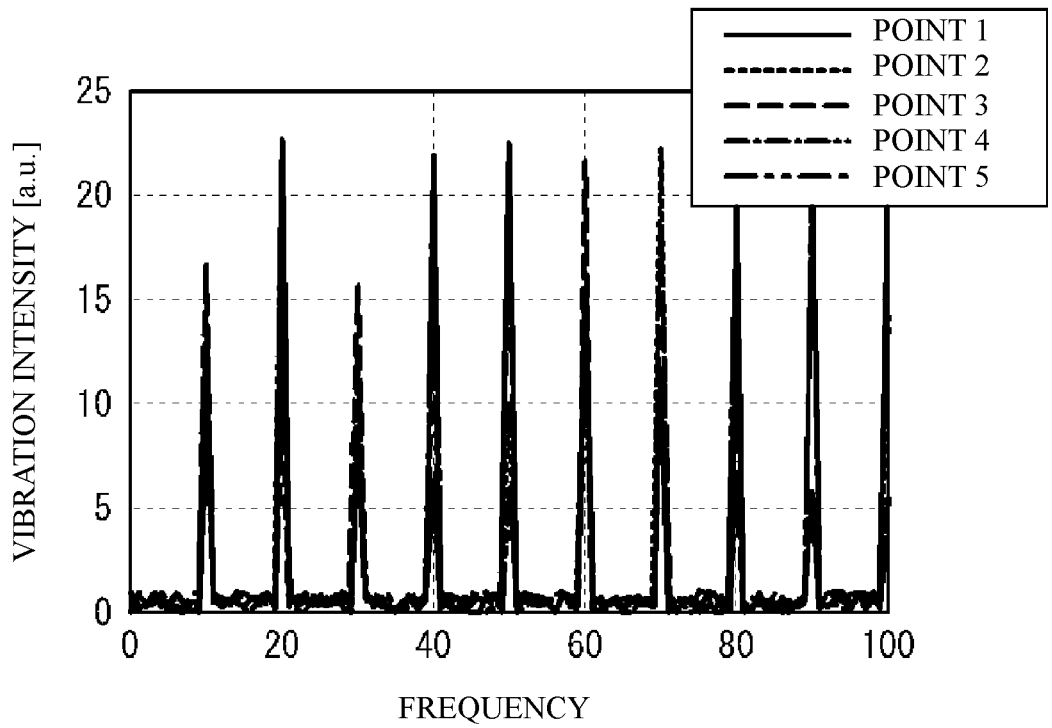
FIG. 5A is a diagram illustrating a relationship between vibration intensity and frequency of an OPGW at a plurality of measurement points of an N-th span.

FIG. 5A is a diagram illustrating a relationship between the vibration intensity and the frequency of the OPGW 5 at a plurality of measurement points of the N-th span. Further, FIG. 5B is a diagram illustrating a relationship between the vibration intensity and the frequency at a plurality of measurement points between the (N+1)-th span.

Figure 5B:
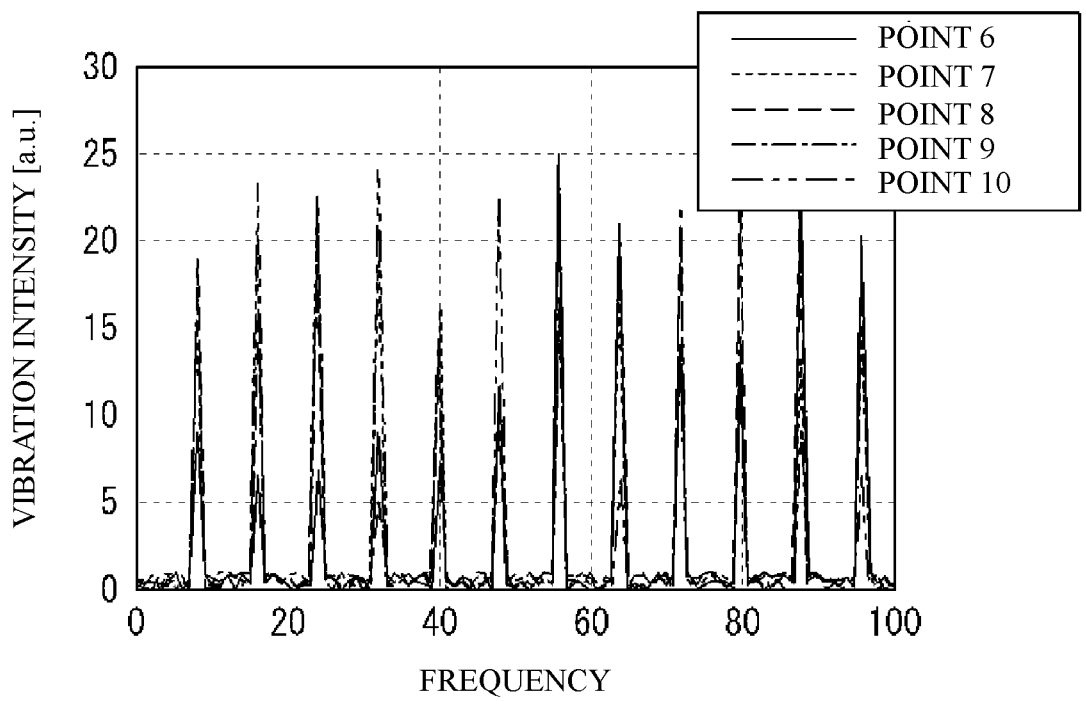
FIG. 5B is a diagram illustrating a relationship between vibration intensity and frequency at a plurality of measurement points between an (N+1)-th span.

As illustrated in FIG. 5A and FIG. 5B, the vibration intensity fluctuates depending on the measurement point even within the same span.

Figure 6A:
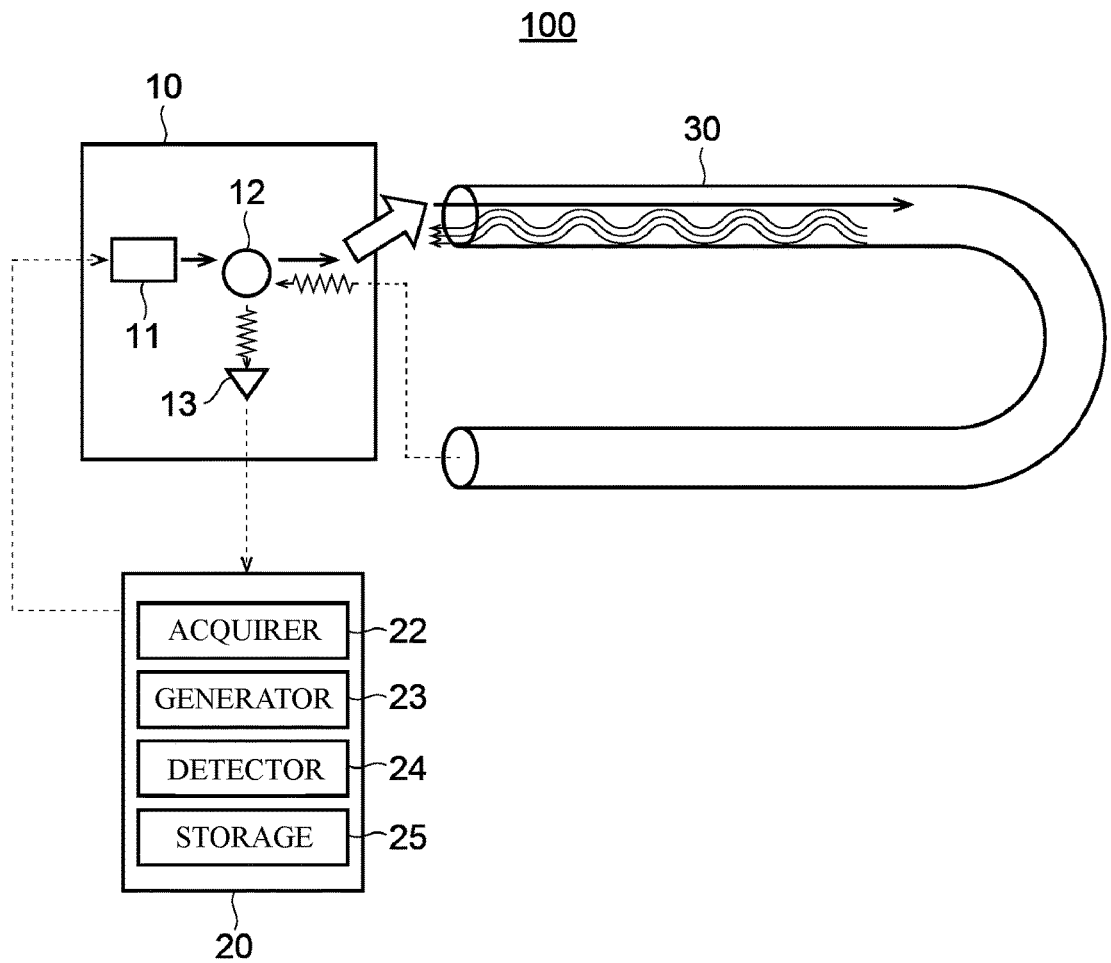
FIG. 6A is a schematic diagram illustrating an overall configuration of an abnormality detection device.

FIG. 6A is a schematic diagram illustrating the overall configuration of the abnormality detection device 100. As illustrated in FIG. 6A, the abnormality detection device 100 includes a measure 10, a calculator 20, and the like. The measure 10 includes a laser 11, an optical circulator 12, a detector 13, and the like. The calculator 20 includes an acquirer 22, a generator 23, a detector 24, and a storage 25.

Figure 6B:
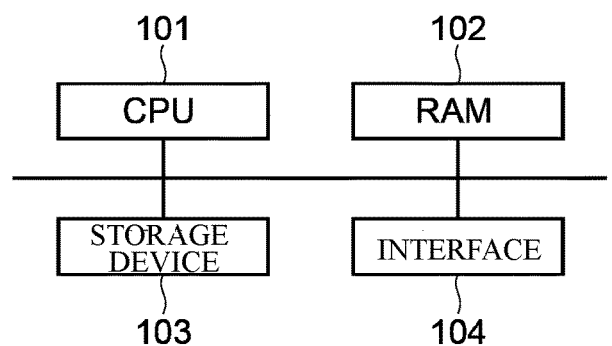
FIG. 6B is a block diagram for explaining a hardware configuration of a calculator.

FIG. 6B is a block diagram for explaining a hardware configuration of the calculator 20. As illustrated in FIG. 6B, the calculator 20 includes a CPU (Central Processing Unit) 101, a RAM (Random Access Memory) 102, a storage device 103, an interface 104, and the like. Each of these devices is connected by a bus or the like. The CPU 101 includes one or more cores. The RAM 102 is a volatile memory that temporarily stores a program executed by the CPU U101, data processed by the CPU 101, and the like. The storage device 103 is a non-volatile storage device. As the storage device 103, for example, a ROM (Read Only Memory), a solid state drive (SSD) such as a flash memory, a hard disk driven by a hard disk drive, or the like can be used. By executing the abnormality detection program stored in the storage device 103 by the CPU 101, the acquirer 22, the generator 23, the detector 24, and the storage 25 are realized in the calculator 20. Each part of the calculator 20 may be a hardware such as a dedicated circuit.

The laser 11 is a light source such as a semiconductor laser, and emits a laser light in a predetermined wavelength range to an optical fiber 30 of the OPGW 5. In the embodiment, the laser 11 emits an optical pulse (laser pulse) at predetermined time intervals. The optical circulator 12 guides the optical pulse emitted by the laser 11 to the optical fiber 30 to be measured for vibration, and guides the backward scattered light returned from the optical fiber 30 to the detector 13.

The optical pulse incident on the optical fiber 30 propagates in the optical fiber 30. The optical pulse gradually attenuates while generating forward scattered light traveling in the propagation direction and backscattered light (return light) traveling in the feedback direction, and propagates in the optical fiber 30. The backscattered light re-enters the optical circulator 12. The backscattered light incident on the optical circulator 12 is emitted to the detector 13. The detector 13 is, for example, a receiver for obtaining a phase difference from the local oscillation light.

Figure 7:
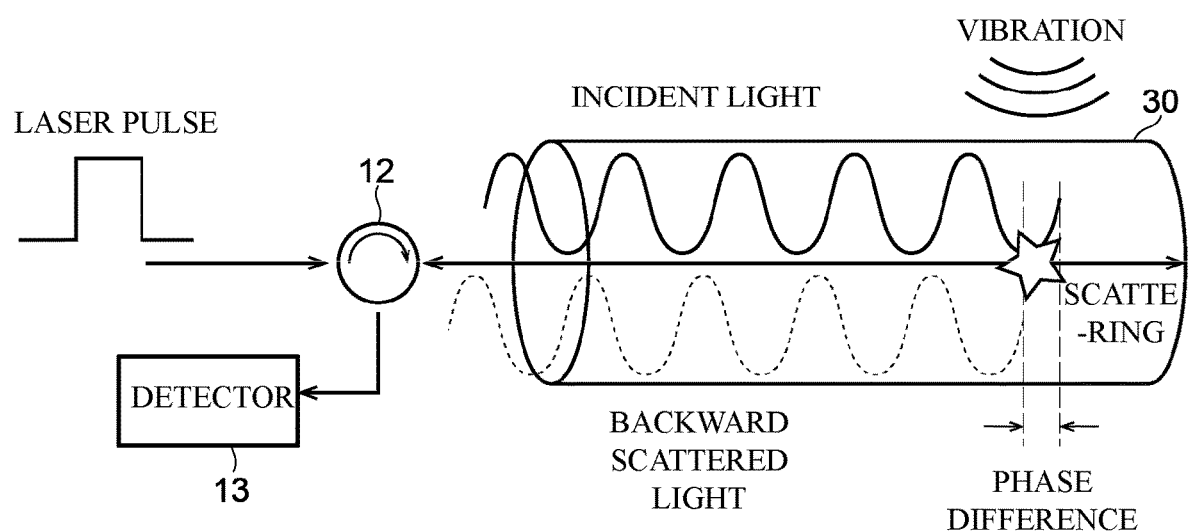
FIG. 7 is a diagram for explaining a principle of vibration measurement.

FIG. 7 is a diagram for explaining the principle of the vibration measurement. As illustrated in FIG. 7, a laser pulse is incident on the optical fiber 30 as incident light. The backward scattered light includes a coherent light of the return light, which is Rayleigh scattered light having the same frequency as the incident light. A phase of the coherent light is shifted due to vibration and the coherent light returns to the optical circulator 12. The acquirer 22 acquires the coherent light of this return light. The generator 23 generates time-series data (hereinafter, referred to as time-series phase data) of the phase difference caused by the expansion and contraction of the optical fiber 30 at each sampling position based on the detection result of the detector 13. The phase difference caused by the expansion and contraction of the optical fiber 30 is, for example, a phase difference caused by a change in time, a phase difference caused by a change in location, a phase difference between incident light and backscattered light, and the like.

The storage 25 stores the time-series phase data at each sampling position which is made by the acquirer 22. The sampling position is a point defined at a predetermined interval or a section defined at a predetermined interval in the stretching direction of the optical fiber 30. For example, the sampling position is a point defined every 1.25 m or a section defined every 1.25 m and having a length of 1.25 m or less in the stretching direction of the optical fiber 30. Each phase difference of the time series phase data may be obtained from the phase difference detected at each point, or may be obtained from a total or an average of the phase differences detected in each section. If the next laser pulse is oscillated before the return light scattered at the end of the optical fiber 30 returns, the return light will be mixed and correct measurement will not be possible. Therefore, the minimum period of the laser pulse is determined by the length of the optical fiber to be measured.

The vibration measurement can be performed using the time-series phase data at each sampling position. For example, from the time-series phase data, it is possible to calculate vibration data indicating how much each sampling position of the optical fiber 30 is displaced per unit time. This method is known as self-interferometry. The physical quantity to be measured differs depending on whether the light to be interfered is local oscillation light or backscattered light. The former is the phase difference corresponding to the strain, and the latter is the phase difference with respect to the strain rate by taking a time difference. By acquiring the phase difference with the laser pulse period, the phase difference can be converted into time-series strain vibration data corresponding to the optical fiber position. Based on such time-series strain vibration data, the generator 23 generates vibration information about the frequency region including the natural frequency of the OPGW 5 as follows.

Figure 8:
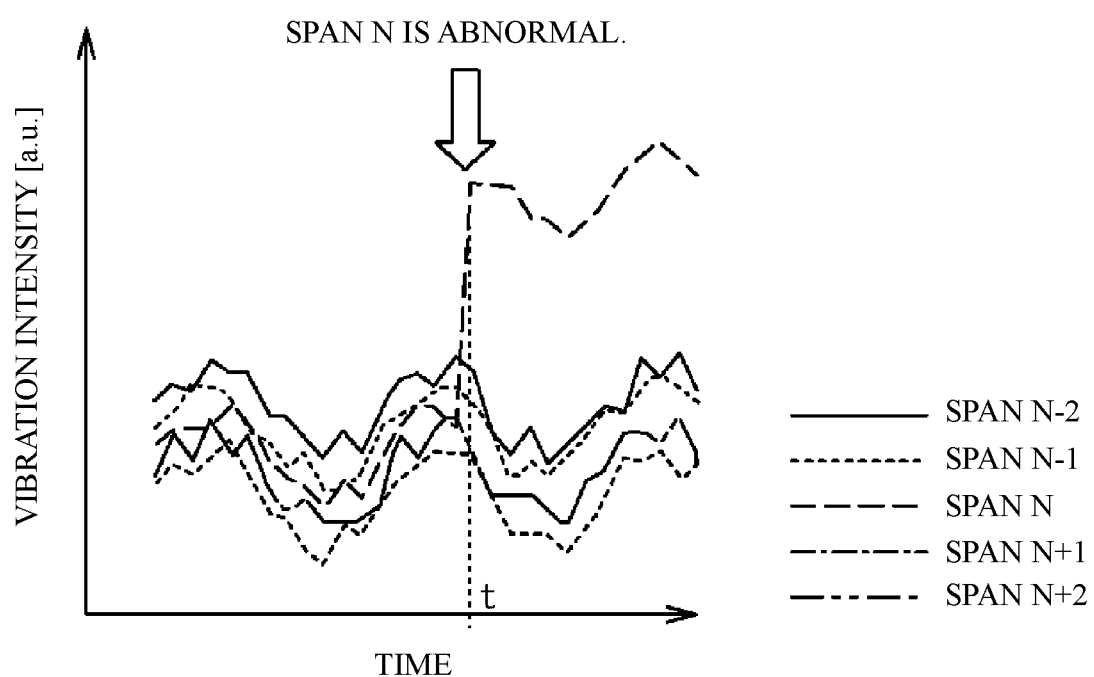
FIG. 8 is a schematic diagram of vibration information generated by a generator.

FIG. 8 is a schematic diagram of vibration information generated by the generator 23. In the example of FIG. 8, the generator 23 generates the variation in time of the intensity of the natural frequency of the OPGW 5 for each of a plurality of spans as vibration information.

Abnormalities may occur in the electrical power transmission facility 1 due to loosening of bolts, dropping of the clamp 2b, variation of the concrete foundation of the steel tower 2, and the like. When anyone of these abnormalities occurs, the vibration intensity of the natural frequency of the OPGW 5 also changes. Therefore, the detector 24 detects an abnormality in the electrical power transmission facility 1 based on the vibration information as illustrated in FIG. 8.

As an example, the detector 24 identifies a span in which the tendency of the variation in time of the intensity of the natural frequency is different from that of the other spans among the plurality of spans, and there is an abnormality in the specified span. In the example of FIG. 8, the vibration intensity of the span N is greatly increased at the time "t", while the vibration intensity tends to decrease in the other spans at the same time "t". The detector 24 determines that there is abnormality in the span N when the time change of the vibration intensity of the span N at a certain time is increased and the time change of the vibration intensity of all other spans at the same time is conversely decreased. Instead of this, when the time change of the vibration intensity of the span N at a certain time decreases and the time change of all the other remaining vibration intensities at the same time increases conversely, the detector 24 may determine that there is an abnormality in the span N.

Further, the difference between the absolute value of the time change of the vibration intensity of the span N at a certain time and the absolute value of the time change of the vibration intensity of the span "i" at the same time exceeds a threshold value for all "i" other than N, the detector 24 may determine that there is an abnormality in the span N.

In any of the above cases, the vibration intensity may be any of a maximum value, an average value, and a median value in the span, and may be the vibration intensity at a typical point in the span.

Figure 9A:
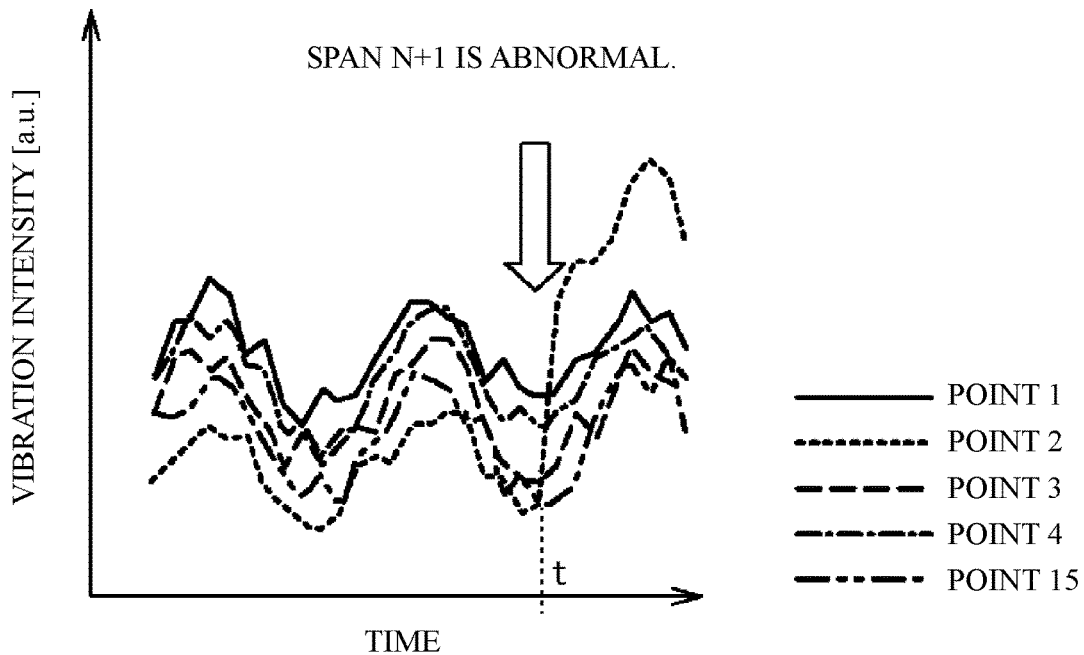
FIG. 9A is a schematic diagram of another example of vibration information generated by a generator.

FIG. 9A is a schematic diagram of another example of the vibration information generated by the generator 23. In this example, the generator 23 generates the variation in time of the intensity of the natural frequency of the OPGW 5 at a plurality of points included in a certain span as vibration information. Further, the generator 23 generates such vibration information for each of a plurality of spans.

The example of FIG. 9A exemplifies the variation in time of the intensity of the natural frequency at a plurality of points in the span N. The span N in this example is an example of the first span.

In this case, the detector 24 determines that there is an abnormality in the span N, when a plurality of points of the span N include points where the tendency of variation in time is different from the tendency of variation in time at other points included in the span N. In this example, the variation in time at "point 2" at time "t" rises sharply, while the variation in time at other points at the same time "t" is gradual. Therefore, the tendency of the variation in time at "point 2" is different from the variation in time at other points. Therefore, the detector 24 determines that there is an abnormality in the span N.

Figure 9B:
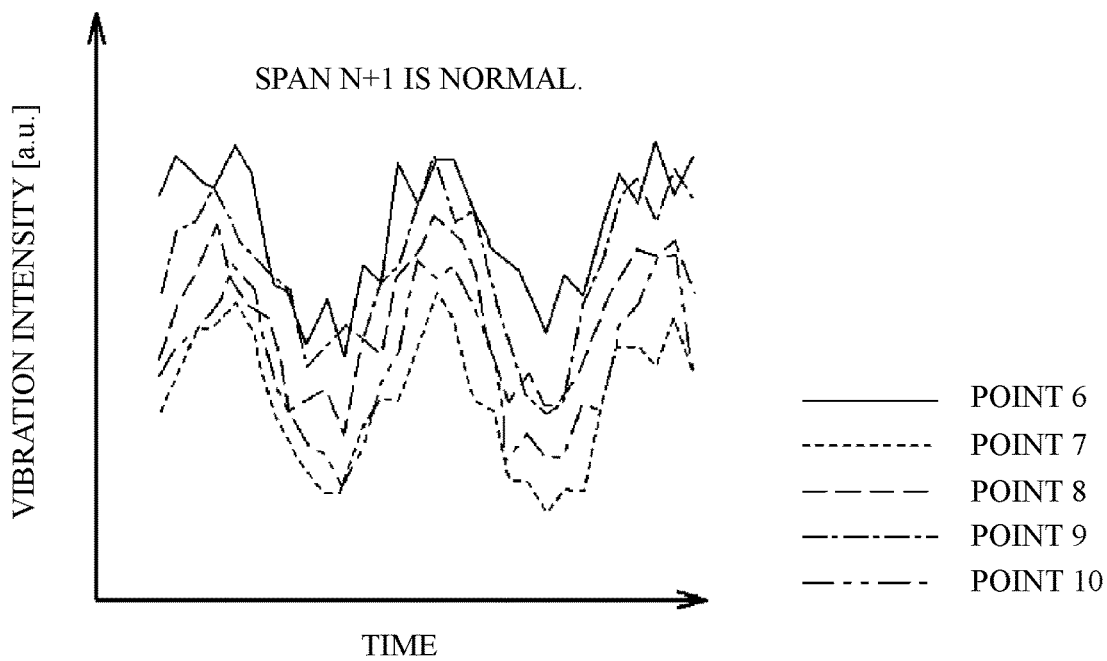
FIG. 9B is a schematic diagram of vibration information in a span N+1 generated by a generator.

FIG. 9B is a schematic diagram of vibration information in the span N+1 generated by the generator 23. In the example of FIG. 9B, each tendency of the time change at all the points included in the span N+1 is similar to each other.

Therefore, the detector 24 determines that the span N+1 is normal and has no abnormality.

Figure 10:
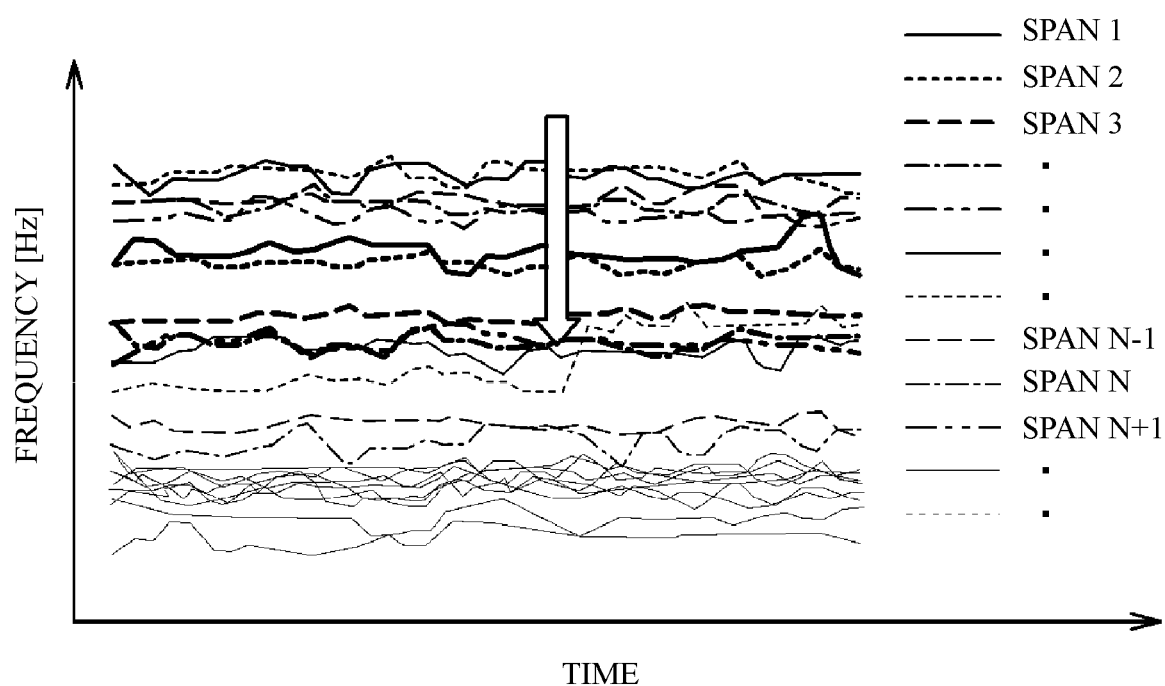
FIG. 10 is a schematic diagram of vibration information generated by a generator.

FIG. 10 is a schematic diagram of vibration information generated by the generator 23. In the example of FIG. 10, the generator 23 generates the variation in time of the frequency of the natural frequency of the OPGW 5 for each of a plurality of spans as vibration information.

Then, the detector 24 identifies a span in which the tendency of the variation in time of the frequency of the natural frequency is different from that of the other spans among the plurality of spans, and determines that there is an abnormality in the specified span. In the example of FIG. 10, the vibration intensity of the span N increases significantly at the time indicated by the arrow, while the vibration intensity tends to decrease at the other spans at the same time. Therefore, the detector 24 identifies that there is an abnormality in the span N. The frequency at this time may be any of a maximum value, an average value, and a median value in the span, and may be the frequency at a typical point in the span.

Figure 11A:
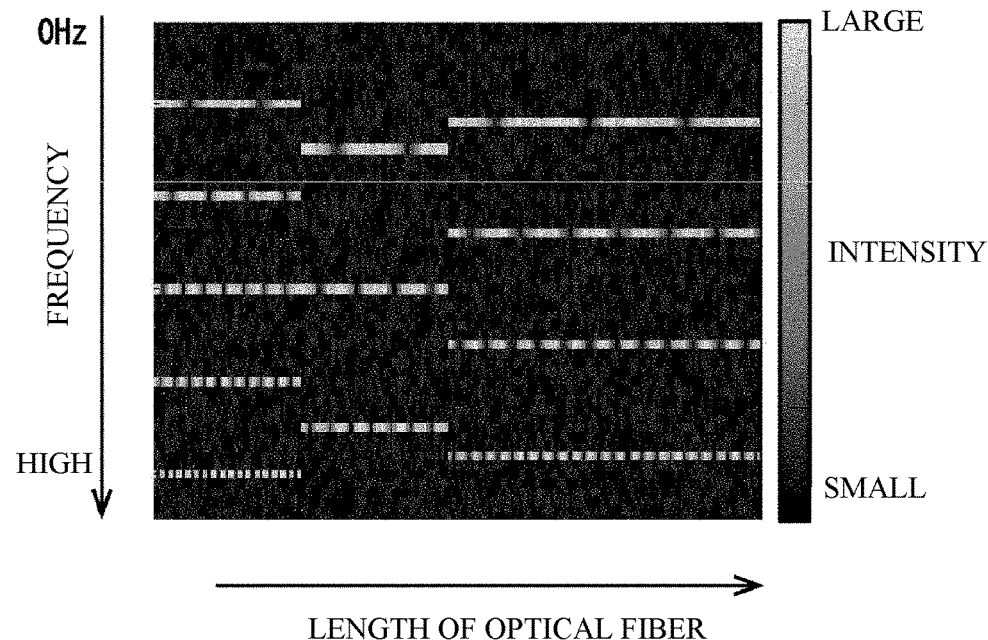
FIG. 11A is a schematic diagram of another example of vibration information generated by a generator.

FIG. 11A is a schematic diagram of another example of the vibration information generated by the generator 23. In this example, the generator 23 generates information indicating the relationship between the length of the OPGW 5 and its natural frequency as vibration information. FIG. 11A is vibration information when the electrical power transmission equipment 1 is normal.

Figure 11B:
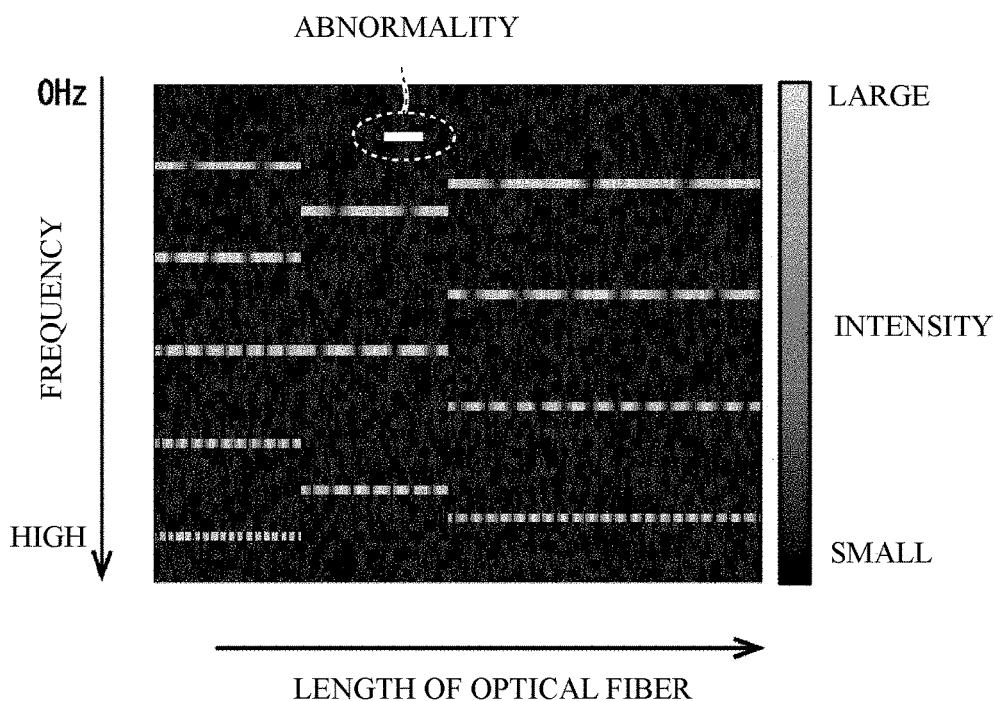
FIG. 11B is a schematic diagram of vibration information when there is an abnormality in an electrical power transmission facility.

On the other hand, FIG. 11B is a schematic diagram of vibration information when there is an abnormality in the electrical power transmission facility 1. In this case, the natural frequency that does not appear in the normal state (FIG. 11A) appears in the vibration information. Therefore, the detector 24 determines that the electrical power transmission facility 1 has an abnormality when the natural frequency that does not appear when the electrical power transmission facility 1 is normal appears in the vibration information.

Figure 12:
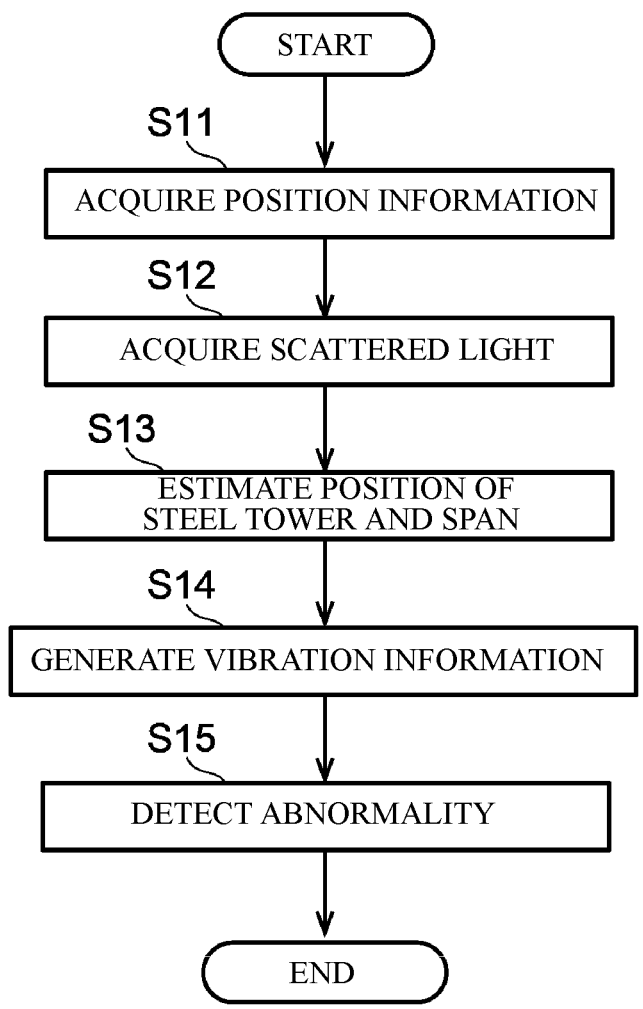
FIG. 12 is a flowchart of the abnormality identification method according to a present embodiment.

Next, the abnormality identification method according to the present embodiment will be described. FIG. 12 is a flowchart of the abnormality identification method according to the present embodiment.

First, the acquirer 22 acquires position information indicating the position of each of the plurality of steel towers 2 (step S11). As an example, the acquirer 22 acquires position information from an external storage device of the abnormality detection device 100. The position information may be stored in the storage 25 in advance, and the acquirer 22 may acquire the position information from the storage 25.

Next, the acquirer 22 acquires coherent light, which is Rayleigh scattered light emitted, from the optical fiber 30 (step S12).

Next, the detector 24 estimates the positions of the plurality of steel towers 2 and the spans (step S13). For example, the detector 24 estimates that the steel tower 2 is located at a position where the linear natural frequencies are discontinuous as illustrated in FIG. 4B. Further, the detector 24 estimates that the interval between the positions of the steel tower 2 thus specified is the span. Then, the detector 24 assigns identifiers 1, 2, . . . , N, N+1, . . . to each of the steel towers 2 based on the position information acquired in step S11. For example, the length of the optical fiber 30 and the position of each steel tower 2 are stored in the position information, and this is compared with the length of the optical fiber 30 in which the natural frequency is discontinuous in FIG. 4B. Thus, the detector 24 assigns an identifier to each of the steel towers 2. After that, the detector 24 estimates the position between the spans based on the position of each of the specified steel towers 2. For example, the detector 24 estimates that the optical fiber 30 located between the N-th steel tower and the (N+1)-th steel tower is the span N.

Next, the generator 23 acquires vibration information according to any one of FIG. 8 to FIG. 11 based on the acquired coherent light (step S14). As the span used in the vibration information, the one estimated in step S13 is used.

After that, the detector 24 detects an abnormality in the electrical power transmission facility 1 based on the vibration information (step S15). For example, the detector 24 detects an abnormality by any of the methods described with reference to FIG. 8 to FIG. 11.

According to the above-described embodiment, the scattered light emitted from the optical fiber 30 is acquired, and the detector 24 detects an abnormality by using the vibration information generated based on the scattered light. Therefore, as illustrated in FIG. 1, the abnormality of the electrical power transmission facility 1 can be detected without providing a large number of vibration sensors 4 in the electrical power transmission facility 1, and the abnormality of the power transmission equipment 1 can be easily detected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A computer-readable, non-transitory medium storing a program that causes a computer to execute a process, the process comprising:
    acquiring a backward Rayleigh scattered light from an optical fiber composite overhead ground wire of an electrical power transmission facility, the electrical power transmission facility including a plurality of steel towers;
    generating vibration information of a frequency band including each natural frequency of natural frequencies of the optical fiber composite overhead ground wire of each span of spans of the plurality of steel towers, on a basis of the backward Rayleigh scattered light; and
    detecting abnormality of the electrical power transmission facility, on a basis of variation in time of an intensity of each natural frequency,
    wherein each natural frequency fluctuates depending on a tension of the optical fiber composite overhead ground wire of each span, and
    wherein a fundamental wave and overtones of the fundamental wave appear as each natural frequency in frequency characteristics of the optical fiber composite overhead ground wire of each span.

2. The medium as claimed in claim 1,
    wherein the detecting is performed by determining one span among the spans of which a tendency of the variation in time is different from those of other spans, and determining that there is abnormality in the one span.

3. The medium as claimed in claim 1,
wherein the vibration information indicates variation in time of each natural frequency of a plurality of points of each span of the spans of the plurality of steel towers, and
wherein the detecting is performed by determining that one span among the spans has abnormality when the plurality of points of the one span includes a point where a tendency of the variation in time is different from those of other points of the one span.

4. The medium as claimed in claim 1,
wherein the vibration information indicates variation in time of a frequency of each natural frequency of the spans of the plurality of steel towers, and
wherein the detecting is performed by determining one span among the spans where a tendency of the variation in time of the frequency is different from those of other spans among the spans and determining that the one span has abnormality.

5. The medium as claimed in claim 1,
wherein the vibration information indicates a relationship between a length of the optical fiber composite overhead ground wire and each natural frequency, and
wherein the detecting is performed by determining that the electrical power transmission facility has abnormality when each natural frequency which does not appear when the electrical power transmission facility is normal appears in the vibration information.

6. The medium as claimed in claim 1,
wherein each natural frequency is expressed by $n/2\ L \times \sqrt{(T/\rho)}$, when "L" is a length of each span, "T" is a tension of the optical fiber composite overhead ground wire of each span, "$\rho$" is a linear density of the optical fiber composite overhead ground wire of each span, and "n" is a natural number indicating a mode of vibration.

7. An abnormality detection device comprising:
a memory; and
a processor coupled to the memory and the processor configured to execute a process, the process comprising:
acquiring a backward Rayleigh scattered light from an optical fiber composite overhead ground wire of an electrical power transmission facility, the electrical power transmission facility including a plurality of steel towers;
generating vibration information of a frequency band including each natural frequency of natural frequencies of the optical fiber composite overhead ground wire of each span of spans of the plurality of steel towers, on a basis of the backward Rayleigh scattered light; and
detecting abnormality of the electrical power transmission facility, on a basis of variation in time of an intensity of each natural frequency,
wherein each natural frequency fluctuates depending on a tension of the optical fiber composite overhead ground wire of each span, and
wherein a fundamental wave and overtones of the fundamental wave appear as each natural frequency in frequency characteristics of the optical fiber composite overhead ground wire of each span.

8. The abnormality detection device as claimed in claim 7,
wherein the detecting is performed by determining one span among the spans of which a tendency of the variation in time is different from those of other spans, and determining that there is abnormality in the one span.

9. The abnormality detection device as claimed in claim 7,
wherein the vibration information indicates variation in time of each natural frequency of a plurality of points of each span of the spans of the plurality of steel towers, and
wherein the detecting is performed by determining that one span among the spans has abnormality when the plurality of points of the one span includes a point where a tendency of the variation in time is different from those of other points of the one span.

10. The abnormality detection device as claimed in claim 7,
wherein the vibration information indicates variation in time of a frequency of each natural frequency of the spans of the plurality of steel towers, and
wherein the detecting is performed by determining one span among the spans where a tendency of the variation in time of the frequency is different from those of other spans among the spans and determining that the one span has abnormality.

11. The abnormality detection device as claimed in claim 7,
wherein the vibration information indicates a relationship between a length of the optical fiber composite overhead ground wire and each natural frequency, and
wherein the detecting is performed by determining that the electrical power transmission facility has abnormality when each natural frequency which does not appear when the electrical power transmission facility is normal appears in the vibration information.

12. The abnormality detection device as claimed in claim 7,
wherein each natural frequency is expressed by $n/2\ L \times \sqrt{(T/\rho)}$, when "L" is a length of each span, "T" is a tension of the optical fiber composite overhead ground wire of each span, "$\rho$" is a linear density of the optical fiber composite overhead ground wire of each span, and "n" is a natural number indicating a mode of vibration.

13. An abnormality detection method implemented by a computer, the method comprising:
acquiring a backward Rayleigh scattered light from an optical fiber composite overhead ground wire of an electrical power transmission facility, the electrical power transmission facility including a plurality of steel towers;
generating vibration information of a frequency band including each natural frequency of natural frequencies of the optical fiber composite overhead ground wire of each span of spans of the plurality of steel towers, on a basis of the backward Rayleigh scattered light; and
detecting abnormality of the electrical power transmission facility, on a basis of variation in time of an intensity of each natural frequency,
wherein each natural frequency fluctuates depending on a tension of the optical fiber composite overhead ground wire of each span, and
wherein a fundamental wave and overtones of the fundamental wave appear as each natural frequency in frequency characteristics of the optical fiber composite overhead ground wire of each span.

14. The method as claimed in claim 13,
wherein the detecting is performed by determining one span among the spans of which a tendency of the variation in time is different from those of other spans, and determining that there is abnormality in the one span.

15. The method as claimed in claim 13,
wherein the vibration information indicates variation in time of each natural frequency of a plurality of points of each span of the spans of the plurality of steel towers, and
wherein the detecting is performed by determining that one span among the spans has abnormality when the plurality of points of the one span includes a point where a tendency of the variation in time is different from those of other points of the one span.

16. The method as claimed in claim 13,
wherein the vibration information indicates variation in time of a frequency of each natural frequency of the spans of the plurality of steel towers, and
wherein the detecting is performed by determining one span among the spans where a tendency of the variation in time of the frequency is different from those of other spans among the spans and determining that the one span has abnormality.

17. The method as claimed in claim 13,
wherein the vibration information indicates a relationship between a length of the optical fiber composite overhead ground wire and each natural frequency, and
wherein the detecting is performed by determining that the electrical power transmission facility has abnormality when each natural frequency which does not appear when the electrical power transmission facility is normal appears in the vibration information.

18. The method as claimed in claim 13,
wherein each natural frequency is expressed by $n/2 L \times \sqrt{(T/\rho)}$, when "L" is a length of each span, "T" is a tension of the optical fiber composite overhead ground wire of each span, "$\rho$" is a linear density of the optical fiber composite overhead ground wire of each span, and "n" is a natural number indicating a mode of vibration.

\* \* \* \* \*

UNITED STATES PATENT AND TRADEMARK OFFICE
CERTIFICATE OF CORRECTION

| | |
|---|---|
| PATENT NO. | : 11,914,206 B2 |
| APPLICATION NO. | : 17/848799 |
| DATED | : February 27, 2024 |
| INVENTOR(S) | : Yoichi Takasu et al. |

It is certified that error appears in the above-identified patent and that said Letters Patent is hereby corrected as shown below:

On the Title Page

Item (73), Column 1, Line 1, delete "Fujitsu Limited" and insert --FUJITSU LIMITED--

Signed and Sealed this
Fourth Day of June, 2024

Katherine Kelly Vidal
*Director of the United States Patent and Trademark Office*